United States Patent [19]

Golden

[11] Patent Number: 4,993,471
[45] Date of Patent: Feb. 19, 1991

[54] SELF-MOUNTING VEHICLE SCREEN

[76] Inventor: Sandra L. Golden, 8218 Brackridge Blvd. South, Jacksonville, Fla. 32216

[21] Appl. No.: 501,315

[22] Filed: Mar. 20, 1990

Related U.S. Application Data

[63] Continuation of Ser. No. 341,904, Apr. 24, 1989, abandoned.

[51] Int. Cl.⁵ .................................. B60J 3/00
[52] U.S. Cl. ..................... 160/370.2; 160/368.1; 296/97.8
[58] Field of Search ............... 160/368.1, 370.2, 354; 296/97.8

[56] References Cited

U.S. PATENT DOCUMENTS

| | | | |
|---|---|---|---|
| 3,753,458 | 8/1973 | Lazarek | 160/368.1 X |
| 4,100,957 | 7/1978 | Shelton | 160/354 X |
| 4,249,589 | 2/1981 | Loeb | 160/354 X |
| 4,353,593 | 10/1982 | Henson | 160/DIG. 2 X |
| 4,398,586 | 8/1983 | Hall | 160/105 |
| 4,562,675 | 1/1986 | Baijas, Jr. et al. | 160/354 X |
| 4,781,231 | 11/1988 | Garcia et al. | 296/37.13 X |
| 4,802,691 | 2/1989 | Watkins | 297/395 X |
| 4,862,943 | 9/1989 | Shafia | 160/370.2 |
| 4,909,004 | 3/1990 | Panttila | 160/114 X |

FOREIGN PATENT DOCUMENTS 2403004  9/1977  France ................ 160/354

Primary Examiner—Blair M. Johnson
Attorney, Agent, or Firm—Thomas C. Saitta

[57] ABSTRACT

A self-attaching screen for vehicle openings comprising a flexible screen material having mounting means along its periphery, whereby the mounting means are resilient projections which temporarily entangle with the fabric surrounding the vehicle opening to form a detachable seal. The screen may be detached and reattached repeatedly without damage to said fabric and no secondary mounting means are required to be permanently attached to the vehicle.

1 Claim, 1 Drawing Sheet

SELF-MOUNTING VEHICLE SCREEN

BACKGROUND OF THE INVENTION

This is a continuation of application Ser. No. 341,904 filed Apr. 24, 1989, now abandoned.

The invention involves the field of flexible screens used to temporarily cover openings in motor vehicles such as cars, vans and trucks. More particularly, the invention involves the field of flexible screens used to temporarily cover roof openings in vehicles, e.g., sun roofs or moon roofs, where the screen is self-mounting to the interior of the vehicle with no permanent attachment to the vehicle of the screen itself nor of any separate mounting means.

The use of flexible screens, usually made of fine mesh wire or plastic material, to cover openings in vehicles is well-known. The purpose of these screens is to provide a temporary means of preventing access to the interior of the vehicle to insects, leaves, debris, etc. while the vehicle windows or sun roofs are in the open position It is often desirable, especially in the warm months, to occupy a parked vehicle while eating, sleeping, watching a drive-in movie, etc., and many times it is also desirable to have the windows or sun roof opened for ventilation. Devices similar to the invention are attached by various methods to the openings to allow air to ventilate while preventing ingress to undesirables.

Some of the known devices of this type utilize resilient or deformable members which are inserted into the window channels as the means for attaching the screen to the window opening. This method will not work on sun roofs, since there is no window track to provide channels for the deformable members. The other main type of screen device uses some sort of secondary mounting means which must be attached on a permanent basis to the vehicle interior. For example, U.S. Pat. No. 3,753,458 to Lazerak teaches attaching the one side of a strip of VELCRO brand fastener around the periphery of the window opening using an adhesive. Obviously, this is an undesirable method, since the strip remains permanently attached and is not aesthetically pleasing.

BRIEF SUMMARY OF THE INVENTION

The invention provides a screen to cover the opening in a vehicle roof formed by the sun roof or moon roof, which is temporarily self-attaching and demountable, where no secondary mounting means are required to be attached to the vehicle.

The invention comprises a sheet of flexible screen material, made for example of fine wire or plastic mesh, which has a plurality of resilient, hook-like projections attached substantially along the entire periphery of the screen material. These hook-like projections are preferably of the type commonly known as the male side of VELCRO brand fastener strips, whereby they are adapted to temporarily engage a pile material to form a strong attachment, while at the same time remain easily detachable through an angular pulling motion. The plurality of hook-like projections may be attached along the periphery of the screen material by any suitable means such as adhesive, sewing or fastening members. Preferably, the hook-like projections cover substantially most or all of the periphery of the screen. The screen material, and therefore the periphery of the screen as well, is sized such that the perimeter of the screen extends beyond the perimeter of the opening for the sun roof, so that the hook-like projections engage the pile of the fabric roof liner material which covers the interior of the roof surrounding the opening. In this manner, the screen is self-attached to the roof in a strong, yet temporary manner, can be easily removed, and requires no secondary means to be permanently attached to the vehicle.

It is an object of this invention to provide a temporary, self-attaching, flexible screen adapted to cover the opening created by a sun roof or moon roof in a vehicle.

It is a further object of this invention to provide such a screen whereby no secondary means of attachment is required, especially such means that is permanently affixed to the vehicle.

It is a further object of this invention to provide such a screen which is inexpensively made, compactly storable and does not affect or mar the interior of the vehicle.

It is a further object of this invention to provide such a screen where the attachment to the vehicle is accomplished by temporarily mating hook-like projections to the nap of the roof fabric, or alternatively mating magnets to the metal trim strip in the roof.

DETAILED DESCRIPTION OF THE INVENTION

Figure 1:
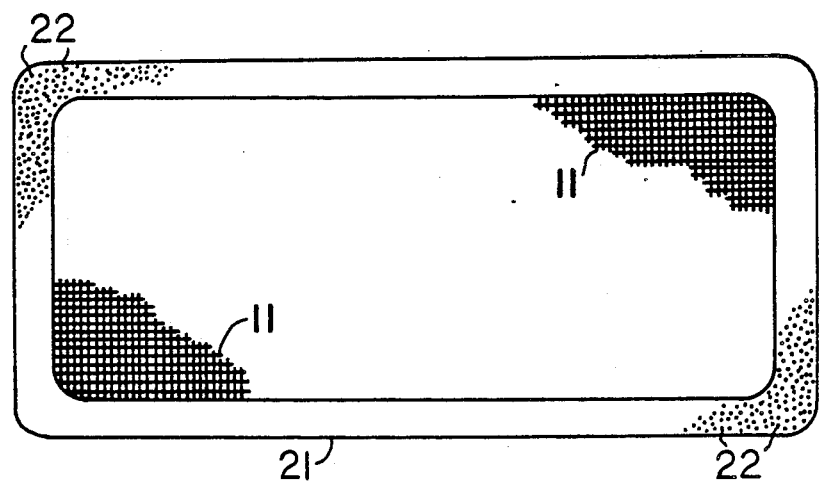
FIG. 1 is a view of the invention in the unmounted state.

With reference now to FIG. 1, an overall view of the invention is shown. The device comprises a section of flexible screen 11, which is shown in substantially rectangular configuration, but which can be configured to correspond to the perimeter shape of the opening in the vehicle roof over which the invention is to extend. Screen 11 is preferably made of a fine mesh plastic web, but can also be made of a fine mesh metal wire web. The size of the apertures in the web is small enough to prevent passage of insects such as mosquitoes or gnats. Preferably, the screen 11 is sufficiently flexible to allow it to be folded for storage without resulting in permanent creasing of the material.

Attached along the outer periphery of screen 11 is mounting means 21, which consists of a strip of material containing a plurality of hook-like projections 22. Mounting means 21 preferably extends completely around the periphery of screen 11, but can be segmented such that a number of shorter segment strips are attached to screen 11 at various locations along the periphery, thereby forming a non-continuous mounting means 21. The mounting means 21 must encompass a substantial portion of the periphery of screen 11 or else gaps will exist between screen 11 and the interior roof material 31, thereby allowing ingress to insects and defeating the purpose of the invention.

Hook-like projections 22 are preferably made of a resilient plastic material and are shaped to have curved end portions which are deformable to allow insertion into a looped or nap-like material, the curved or hooked end portion then acting to grasp the loops or nap, thereby forming a strong yet temporary attachment. For example, the male side of a VELCRO brand fastener strip is ideally suited for the purposes of the invention.

The mounting means 21 may be attached to screen 11 by any suitable fastening means. Preferably, an edging material 32, such as bias tape or any type of non-raveling cloth, is folded around the edge of screen 11 and mounting means 21 is then stitched in place. Edging material 32 prevents screen 11 from disassembling, provides a smooth edge and acts as a backing for mounting means 21. Besides stitching mounting means in place, adhesive tape, adhesive alone, brads, etc. may also be utilized, as long as a strong, permanent attachment is achieved. The inner perimeter of the mounting means 21 is adapted so that it extends beyond the outer perimeter of the opening in the roof of the vehicle, ideally completely encircling this opening.

Figure 2:
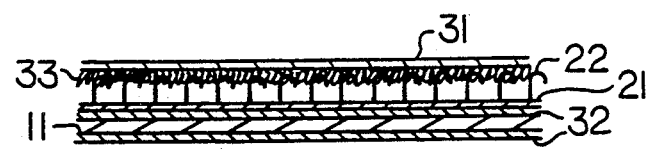
FIG. 2 is a cross-sectional view through the periphery of the invention, showing the hook-like projections attached to the fabric of a vehicle interior.

The method of attachment is shown in FIG. 2. In this sectional, segmented view, mounting means 21 containing hook-like projections 22 is attached to edging material 32, which has been folded over the edge of screen 11. The screen is attached to the interior of the roof of the vehicle by pressing mounting means 21 against the interior fabric 31 mounted inside the vehicle roof which surrounds the opening created by the sun roof. The hook-like projections 22 are pressed into the loops or nap 33 of interior fabric 31, where they become temporarily entangled and create a strong and complete attachment area. Since mounting means 21 extends completely or substantially around the periphery of screen 11, an integral seal is formed whereby insects cannot enter the interior of the vehicle while the sun roof is open. When it is desired to remove screen 11 form the opening, the attachment between the mounting means 21 and the interior fabric 31 is easily broken by pulling on one corner of screen 11 to create an angular detaching motion The hook-like projections 22 temporarily deform as they are pulled from the nap 33, then resume their normal state ready for re-attachment when desired.

As has been described, the invention is ideally suited for use on vehicles having roof openings, since such openings are universally surrounded by fabric material. The invention has been found to work best on velour-type fabrics, but any similar fabric having sufficient nap or looped pile to allow entanglement of the hook-like projections 22 is also suitable. Likewise, while the invention has been described with reference to roof openings, it is obvious that the invention can be utilized on side or rear windows as well where such windows are completely surrounded by fabric. The invention leaves no permanent markings or damage on the interior fabric 31. It has been found that the attachment is of sufficient strength so that the screen 11 remains in place even while the vehicle is being driven.

The above examples and descriptions are by way of example only, as it will be obvious to one skilled in the art that equivalents and substitutions are possible. Therefore, the definition and scope of the invention is to be as set forth in the following claims.

I claim:

1. A method of temporarily attaching a screen over a vehicle opening surrounded by a napped or looped fabric roof liner material, consisting of the following steps:
   (A) providing a multi-apertured sheet of material having a perimeter slightly greater than the perimeter of said vehicle opening, the sheet having a plurality of resilient, hook-like projections around its periphery, the projections being capable of entanglement directly with the fabric roof liner material to form a temporary attachment;
   (B) pressing the projections directly against the fabric roof liner material to form the temporary attachment.

* * * * *